(12) United States Patent
Enenkiel (10) Patent No.: US 7,532,906 B2
(45) Date of Patent: *May 12, 2009

(54) MOBILE ELECTRONIC DEVICE AND METHODS FOR PROVIDING INFORMATION TO A MOBILE ELECTRONIC DEVICE USING A WEB SERVICE

(75) Inventor: Achim Enenkiel, Karlsruhe (DE)

(73) Assignee: SAP AG, Walldor (DE)

( * ) Notice: Subject to any disclaimer, the term of this patent is extended or adjusted under 35 U.S.C. 154(b) by 455 days.

This patent is subject to a terminal disclaimer.

(21) Appl. No.: 11/192,289

(22) Filed: Jul. 29, 2005

(65) Prior Publication Data

US 2007/0026855 A1 Feb. 1, 2007

(51) Int. Cl.
*H04M 1/00* (2006.01)

(52) U.S. Cl. .................. 455/550.1; 455/456.2; 455/425; 455/412.1; 455/414.1; 455/403; 455/562.1; 455/422.1; 709/218; 707/10

(58) Field of Classification Search .............. 455/550.1, 455/425, 556.1–556.2, 456.1–457, 418–429, 455/403, 414.1; 370/328, 331, 338; 709/203, 709/218–219, 226; 707/203, 10
See application file for complete search history.

(56) References Cited

U.S. PATENT DOCUMENTS

| | | | |
|---|---|---|---|
| 6,169,897 B1 * | 1/2001 | Kariya .................... | 455/456.3 |
| 6,985,939 B2 | 1/2006 | Fletcher | |
| 7,089,298 B2 * | 8/2006 | Nyman et al. ............... | 709/220 |
| 7,162,543 B2 * | 1/2007 | Fischer et al. ............... | 709/248 |
| 7,249,100 B2 * | 7/2007 | Murto et al. .................. | 705/50 |
| 7,275,105 B2 * | 9/2007 | Bloch et al. ................. | 709/227 |
| 7,310,532 B2 * | 12/2007 | Knauerhase et al. ..... | 455/456.1 |
| 7,343,428 B2 | 3/2008 | Fletcher | |
| 2002/0161633 A1 * | 10/2002 | Jacob et al. .................... | 705/14 |
| 2002/0173317 A1 * | 11/2002 | Nykanen et al. ............ | 455/456 |
| 2003/0013483 A1 * | 1/2003 | Ausems et al. .............. | 455/556 |

(Continued)

FOREIGN PATENT DOCUMENTS

WO   WO 01/18688 A2   3/2001

(Continued)

OTHER PUBLICATIONS

Sheng-Tzong Cheng, et al., "A New Framework for Mobile Web Services," Proceedings of the 2002 Symposium on Applications and the Internet (SAINT'02w), Jan. 28-Feb. 1, 2002, pp. 218-222.

*Primary Examiner*—Kamran Afshar
(74) *Attorney, Agent, or Firm*—Finnegan, Henderson, Farabow, Garrett & Dunner, LLP (57) ABSTRACT

A mobile electronic device and methods for providing information to a mobile electronic device using a web service are disclosed. In one implementation, a mobile electronic device is provided that comprises a request processing component for receiving an information request, a wireless interface for coupling the mobile electronic device to a network in order to obtain an online of the information from a web service, and a storage component for storing an offline version of the information, wherein the request processing component is adapted to send a web service request to the web service in response to the information request if the mobile electronic device is within a network coverage area and otherwise to access the storage component.

29 Claims, 6 Drawing Sheets

U.S. PATENT DOCUMENTS

| | | | |
|---|---|---|---|
| 2003/0018661 A1 | 1/2003 | Darugar | |
| 2003/0093436 A1 | 5/2003 | Brown | |
| 2003/0110242 A1 | 6/2003 | Brown | |
| 2003/0163513 A1 | 8/2003 | Schaeck | |
| 2003/0187841 A1 | 10/2003 | Zhang | |
| 2003/0231656 A1* | 12/2003 | Wahl | 370/468 |
| 2004/0003130 A1 | 1/2004 | Becker | |
| 2004/0029525 A1* | 2/2004 | Vertelney | 455/3.06 |
| 2004/0045005 A1 | 3/2004 | Karakashian | |
| 2004/0064503 A1 | 4/2004 | Karakashian | |
| 2004/0213409 A1* | 10/2004 | Murto et al. | 380/258 |
| 2005/0182761 A1* | 8/2005 | Kato | 707/3 |
| 2005/0286857 A1* | 12/2005 | Kallio | 386/46 |
| 2006/0004771 A1* | 1/2006 | Enenkiel | 707/10 |
| 2006/0015459 A1* | 1/2006 | Enenkiel | 705/40 |
| 2006/0031413 A1* | 2/2006 | Enenkiel | 709/219 |
| 2006/0040711 A1* | 2/2006 | Whistler | 455/566 |
| 2006/0064406 A1* | 3/2006 | Ehrich et al. | 707/3 |
| 2006/0069981 A1* | 3/2006 | Enenkiel | 715/500 |
| 2006/0123107 A1* | 6/2006 | Chen | 709/224 |
| 2006/0211437 A1* | 9/2006 | Yang | 455/518 |
| 2007/0027835 A1* | 2/2007 | Enenkiel | 707/1 |
| 2007/0055591 A1* | 3/2007 | Enenkiel | 705/31 |
| 2007/0078860 A1* | 4/2007 | Enenkiel | 707/10 |
| 2007/0094288 A1* | 4/2007 | Enenkiel | 707/101 |
| 2007/0106673 A1* | 5/2007 | Enenkiel | 707/10 |

FOREIGN PATENT DOCUMENTS

WO    WO 02/093290 A2    11/2002

\* cited by examiner

MOBILE ELECTRONIC DEVICE AND METHODS FOR PROVIDING INFORMATION TO A MOBILE ELECTRONIC DEVICE USING A WEB SERVICE

DESCRIPTION OF THE INVENTION

1. Field of the Invention

The present invention generally relates to the field of data processing. More particularly, the invention relates to mobile web services and methods for providing information to a mobile electronic device using a web service.

2. Background of the Invention

Web services are an emerging technology that offers the dual promise of simplicity and pervasiveness. Web services may be informational or transactional. While some services provide information of interest to the requester, other services may actually lead to the invocation of business procedures. Examples of publicly available web services today include stock quote services, services to retrieve news from Web news sources, and currency conversion services.

Examples of web services include services responsive to simple object access protocol (SOAP) messages. SOAP is an application invocation protocol that defines a protocol for exchanging information encoded as XML messages. Normally, these services are described by WSDL (Web Service Description Language) notation stored in WSDL documents.

A WSDL document can be stored in numerous ways such as in a file, in a DB2 XML registry/repository, or in a DB2 based UDDI registry. UDDI (Universal Description, Discovery, Integration) is a protocol for describing web services such that interested parties may easily discover them. Specifications for this registry and use of WSDL in the registry are available, for example, at http://www.uddi.org/. Service providers may register their services in a UDDI, specifying technical information about how to invoke the service. Often a WSDL document is stored in a UDDI registry in order to define the messages a particular web service accepts and generates.

The design of UDDI allows enterprises that own web service enabled applications to publish data about themselves and their services. By providing this information, UDDI implements a simplified form of searching for those interested in locating a particular service in which to fulfill an application process. The conventional UDDI search is focused on single search criteria, such as business name, business location, business categories, business identifier, service type by name, and discovery URL (Uniform Resource Locator).

Various approaches for implementing web services are identified in, for example, the following U.S. published patent applications: 2003/0093436A1, 2003/0055868A1, 2003/0055624A1, 2003/0018661, 2003/0110242, 2003/0163513A1, 2004/0064503A1, 2004/0045005A1, 2004/0003130A1, and 2003/0187841A1.

Furthermore, mobile web services are identified in articles, such as in "A New Framework for Mobile Web Services", Sheng-Tzong Cheng, Jian-Pei Liu Jian-Lun Kao, Chia-Mei Chen, Dept. of Comput. Sci. & Inf. Eng., Nat. Cheng Kung Univ., Tainan, Taiwan; Applications and the Internet (SAINT) Workshops, 2002 Proceedings, 2002 Symposium on Applications and the Internet, Publication Date: 28 Jan.-1 Feb. 2002, pages: 218-222, INSPEC Accession Number: 7231742.

A common disadvantage of mobile web services is that they present a single point of failure just like common central databases do. If a mobile web service fails due to loss of network coverage or due to failure of the mobile web service itself, the respective informational and/or transactional data processing service provided by the web service becomes unavailable.

SUMMARY OF THE INVENTION

In accordance with an embodiment of the present invention a mobile electronic device is provided that may comprise a request processing component for receiving an information request for information, a wireless interface for coupling the mobile electronic device to a network in order to obtain an online version of the information from the web service, and a storage component for storing an offline version of the information. The request processing component may be adapted to send a web service request to the web service in response to the information request if the mobile electronic device is within a network coverage area and otherwise to access the storage component.

The mobile electronic device can be a mobile computing device, such as a palmtop or laptop computer, a handheld electronic appliance, such as a mobile telephone, a personal digital assistant, a smartphone, a digital camera, or the like, and/or a car navigation system. An information request of such applications can be of various kinds. For example, the information request can be directed towards obtaining traffic information for use by a routing or navigation application, weather report information, event information and/or calendar information such as for synchronizing an electronic calendar.

In accordance with another embodiment of the present invention, the information request may be entered manually by a user. Alternatively, the information request is generated automatically by an application program being executed on the mobile electronic device.

In accordance with another embodiment of the present invention, the mobile electronic device may be coupled to a positioning component that provides location information being indicative of a current geographical position of the mobile electronic device. For example, the mobile electronic device is coupled to a global positioning system (GPS) receiver for providing the location information or it uses a wireless cellular network, such as a GSM or UMTS network for obtaining the location information, such as by means of a triangulation technique or using the cell identifier of the cell where the mobile electronic device is currently located. Various other suitable positioning techniques can also be used for implementing the positioning component.

The geographical positioning information can be included in the information request for specification of the requested information. For example, if the information request is directed towards traffic information the traffic information returned by the web service can be limited to traffic information that is of relevancy with respect to the current location of the mobile electronic device.

In accordance with a further embodiment of the present invention, the mobile electronic device may have a clock that provides the local time. This time information can be included in the information request for specification of the requested information. The time information can be combined with the location information. For example, if the information request is directed towards obtaining event information, the event information returned from the web service can be limited to such events that are of relevancy with respect to the current position and local time of the mobile electronic device.

In accordance with yet another embodiment of the present invention, the wireless interface of the mobile electronic device may provide status information. The status information may be descriptive of a current status of the wireless interface. For example, the status information indicates whether the wireless interface is currently coupled to the wireless network, in other words, whether there is network coverage or not.

Further, the status information can indicate if there is unused data transmission capacity. For example, an attempt for sending a web service request is only made if the status information indicates that the mobile electronic device is within the coverage of the network. Preferably, an update operation of the offline version of the information stored locally on the mobile electronic device is performed if the status information indicates unused data transmission capacity. Updating the offline version of the information is usually less urgent than other data transmission requirements; hence performing the update operation when there is unused data transmission capacity avoids to negatively impact latency times experienced by a user regarding transmission of real time or non-real time data, such as voice or data, via the wireless interface.

In accordance with yet another embodiment of the present invention, failure resistance is provided by using a list of alternative web services. If no web service response is received within a predetermined time window, the web service request is resent to an alternative web service. If the alternative web service does also not respond, the web service request can be resent another time to still another alternative web service until a response is received. Preferably, priorities are assigned to the alternative web services, whereby the web service request is resent to the alternative web services in the order given by the priorities.

In accordance with yet another embodiment of the present invention, the mobile electronic device may have an updating component for obtaining the online version of the information from the web service while the mobile electronic device is within the network coverage area. This may be advantageous in that the offline version stored on the mobile electronic device can be updated by the online version each time the mobile electronic device is within a network coverage area. As a consequence, the user has access to relatively up to date information even if he or she is outside a network coverage area.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiment of the invention and together with the description, serve to explain the principles of the invention.

BRIEF DESCRIPTION OF THE DRAWINGS

In the following preferred embodiments of the invention are described in greater detail by way of example only making reference to the drawings in which.

DESCRIPTION OF THE EMBODIMENTS

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Figure 1:
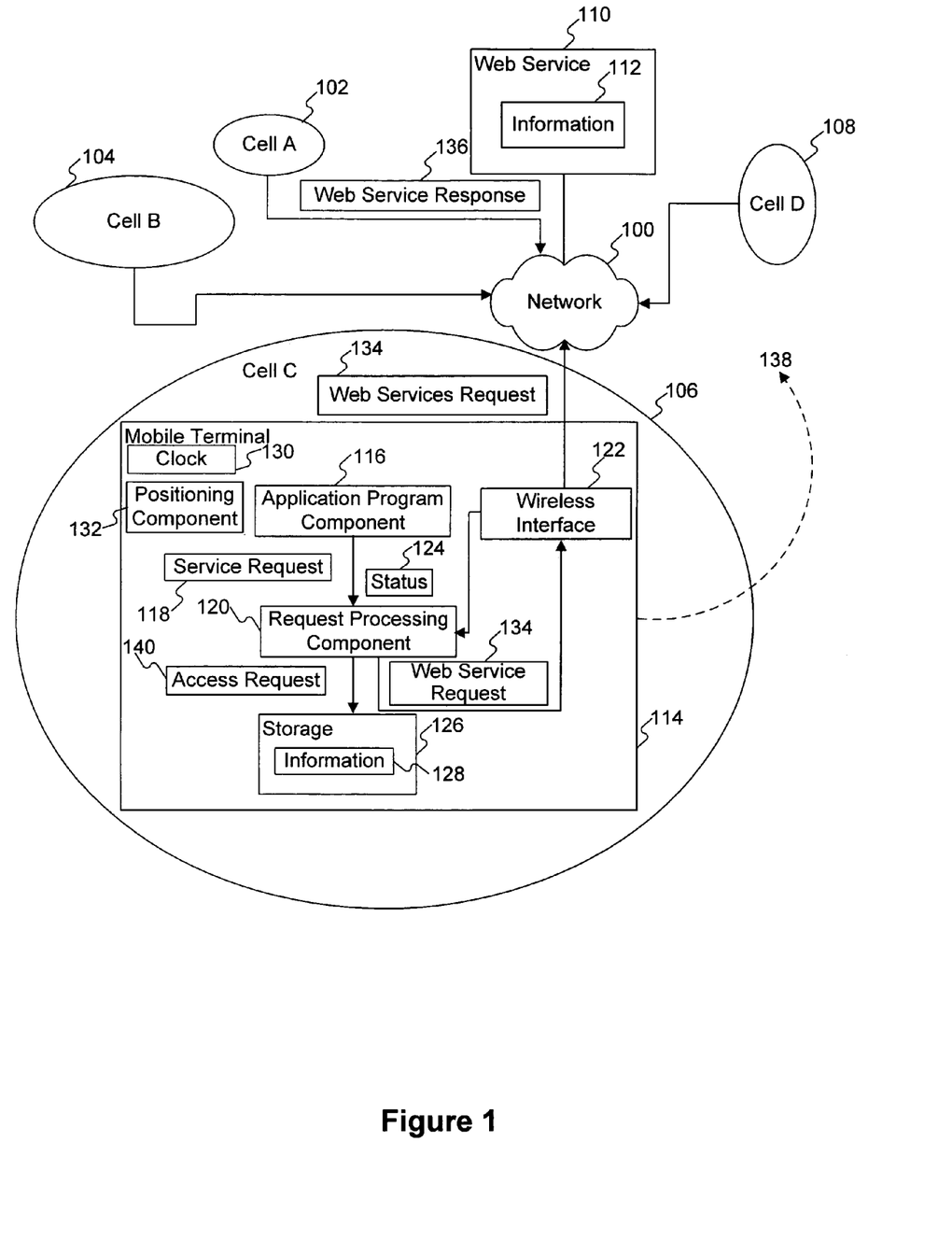
FIG. 1 is a block diagram of an exemplary mobile terminal in a cellular wireless telecommunication network, consistent with an embodiment of the invention.

FIG. 1 shows a wireless network 100. In the embodiment considered with respect to FIG. 1, the wireless network 100 is cellular, such as a GSM (Global System for Mobile Communications), GPRS (General Packet Radio Service), UMTS (Universal Mobile Telephone System), WLAN (Wireless Local Area Network) and/or IEEE network. The cells A 102, B 104, C 106 and D 108 are shown by way of example in FIG. 1.

The wireless network 100 provides Internet connectivity. At least one web service 110 is accessible via the wireless network 100. The web service 110 can be of any nature, such as informational or transactional. In the example considered here, the web service 110 stores an online version of information 112. A mobile terminal 114 is located within the cell C 106. In other words, the mobile terminal 114 is located within a network coverage area of the network 100 in which network services are provided.

The mobile terminal 114 can be a mobile computing device, such as a palmtop or laptop computer, a handheld electronic appliance, such as a personal digital assistant, a smartphone or a digital camera, or another mobile electronic apparatus, such as a car navigational system or the like.

The mobile terminal 114 may have an application program component 116 that can generate a service request 118. The service request 118 is directed towards information that is required by the application program component 116. The service request 118 can contain a specification of the required information.

The application program component 116 is coupled to a request processing component 120 that can receive the service request 118.

The request processing component 120 is coupled to a wireless interface 122 of the mobile terminal 114. The request processing component 120 can receive status information 124 from the wireless interface 122. The status information 124 indicates whether the mobile terminal 114 is within the network coverage or not. Furthermore, the status information 124 can indicate whether there is unused data transmission capacity on the data transmission channel provided by the wireless network 100 for the mobile terminal 114.

The mobile terminal 114 has a non-volatile storage 126 for storing an offline version of the information 112, i.e., information 128.

Optionally, the mobile terminal 114 may further comprise a clock 130 that provides the current time and/or a positioning component 132 that provides location information regarding the current geographical position of the mobile terminal 114. The positioning component 132 can be implemented by means of a GPS receiver. Alternatively, the location information can be provided using respective services of the wireless network 100. For example, the cell identifier of the cell where the mobile terminal 114 is currently located can serve as such location information.

In operation, the application program component 116 may generate the service request 118 in order to request information. The service request 118 can contain a specification of the required information. Such a specification can be given by including the current time obtained from the clock 130 and/or location information obtained from the positioning component 132 by the application program component 116.

The service request 118 is received by the request processing component 120. If the status information 124 indicates that the mobile terminal 114 is currently within a network coverage area, the request processing component 120 transforms the service request 118 into a web service request 134 that is sent via the wireless interface 122 to the web service 110. The web service 110 generates a respective web service response 136 that contains the online version of the information 112. The web service response 136 is received by the mobile terminal 114 by means of its wireless interface 122 and entered into the application program component 116.

If the mobile terminal 114 is moved outside the network coverage of network 100, such as to a location 138, this is reflected by the respective status information 124 that indicates that network service is no longer available.

If the request processing component 120 receives the service request 118 when the status information 124 indicates that no network service is available, the request processing component 120 transforms the service request 118 into an access request 140 in order to access the offline version of the information 128 stored in the storage 126 of the mobile terminal 114. In response, the information 128 is returned to the application program component 116. This has the advantage that even if there is no network coverage by the wireless network 100, the application program component 116 does not have to wait until the mobile terminal 114 is moved back within the network coverage before it can continue its program execution.

Figure 2:
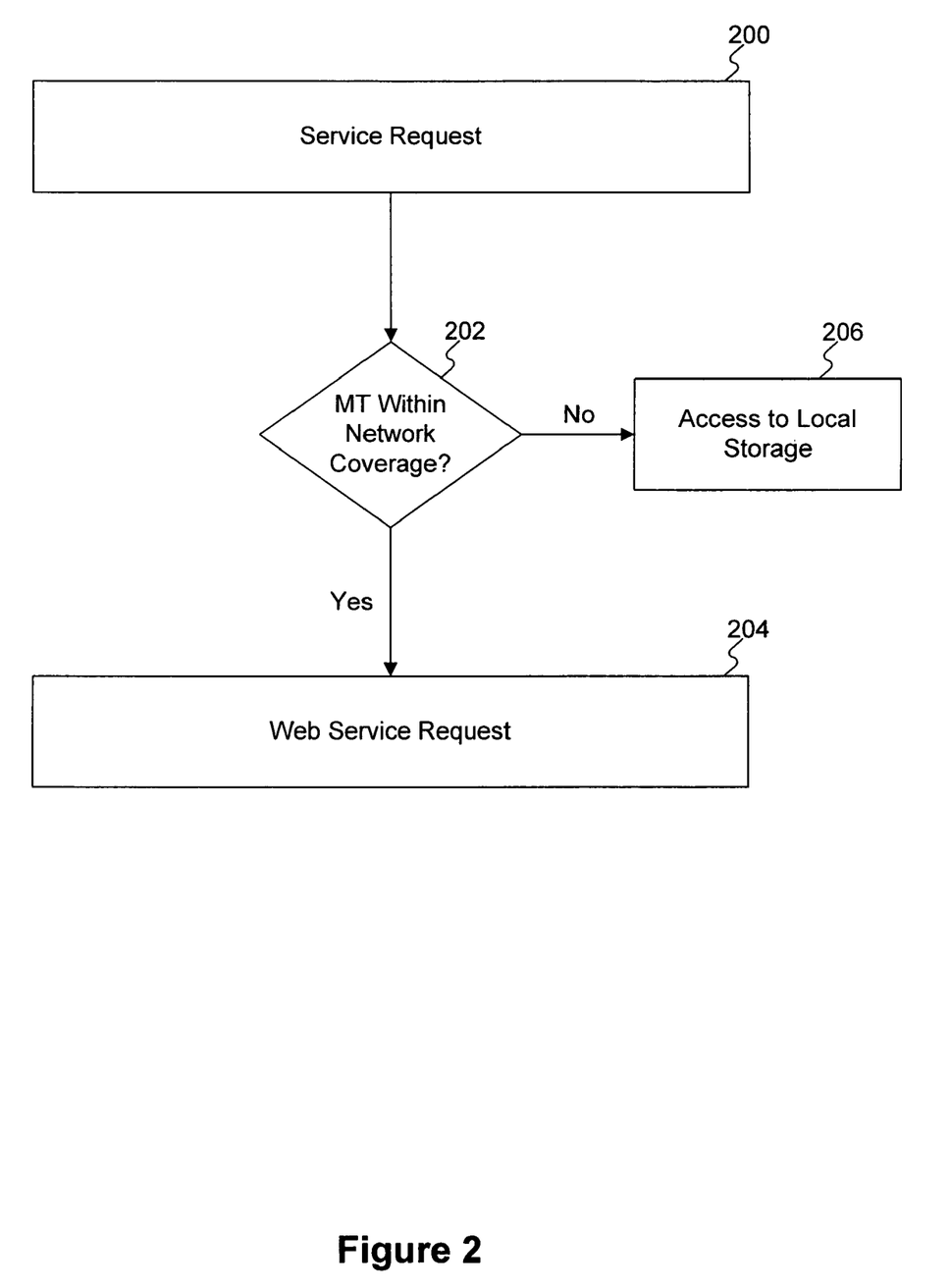
FIG. 2 is a flowchart illustrating an exemplary method, consistent with an embodiment of the invention.

FIG. 2 is a flowchart illustrating an exemplary method, consistent with an embodiment of the invention. As illustrated in FIG. 2, the service request for obtaining information may be received by the mobile terminal in step 200. The service request can be generated internally by an application program component, or it can be received from an external source, such as by a user's entry into the mobile terminal.

In step 202, a determination is made whether the mobile terminal (MT) is within network coverage or not. If the network is currently available, a web service request is sent to a web service via the wireless interface of the mobile terminal in order to request the information (step 204). If the mobile terminal is currently outside the network coverage, the local storage component of the mobile terminal is accessed in order to read an offline version of the requested information (step 206).

Figure 3:
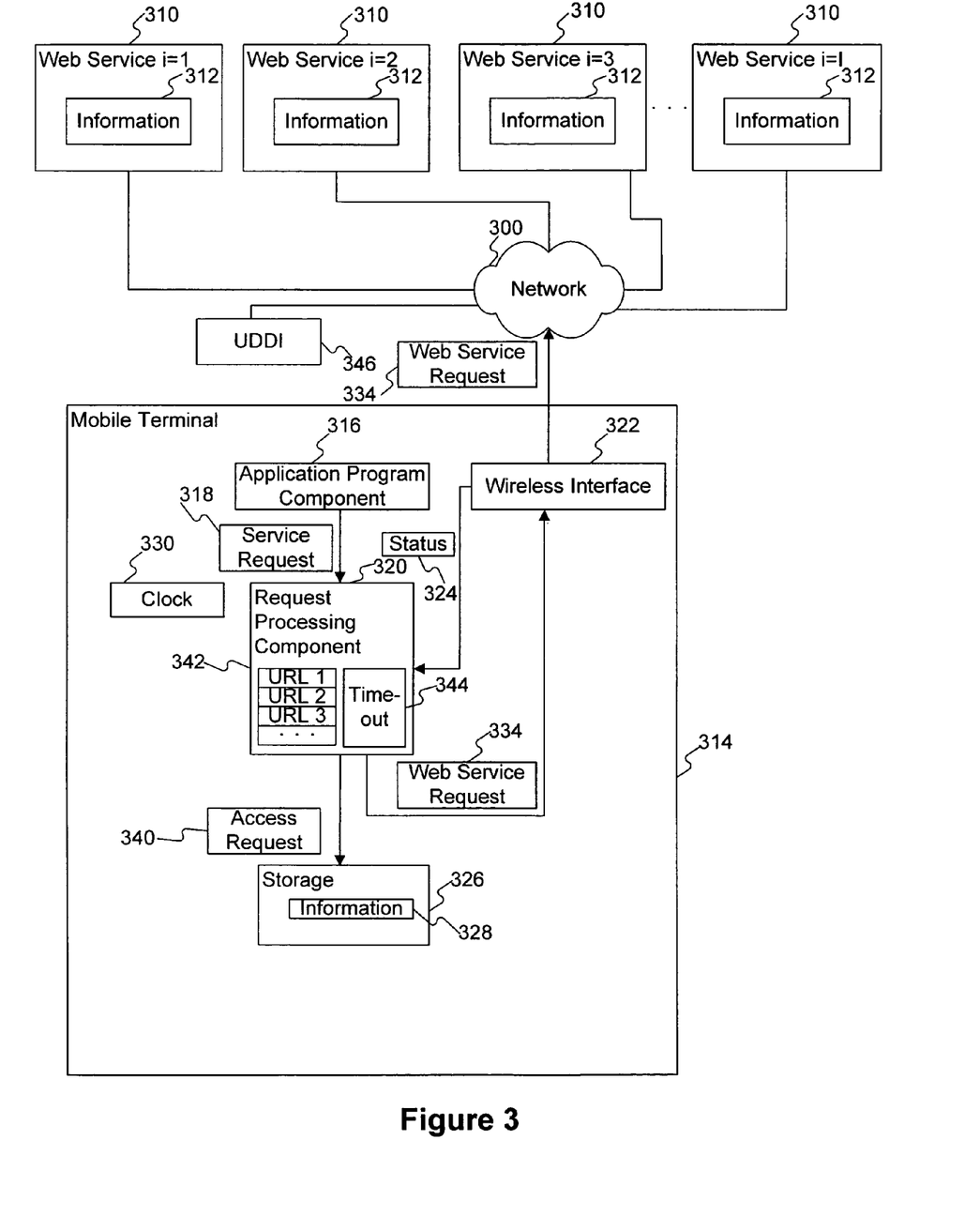
FIG. 3 is a block diagram of an exemplary mobile terminal being coupled to alternative web services via a wireless network, consistent with an embodiment of the invention.

FIG. 3 is a block diagram of an exemplary mobile terminal coupled to alternative web services via a wireless network, consistent with an embodiment of the invention. Elements in the embodiment of FIG. 3 that correspond to elements in the embodiment of FIG. 1 are designated by like reference numerals.

In the embodiment of FIG. 3, the wireless network 300 is coupled to a number of alternative web services 310. The alternative web services 310 provide substantially identical or equivalent versions of the online information 312. The alternative web services 310 can differ regarding the format in which the information 312 is requested, provided and/or regarding other characteristics such as geographical coverage of the information, timeliness of the information, cost of the information, etc.

The mobile terminal 314 comprises a prioritized list 342 of the alternative web services 310. The prioritized list 342 can be an integral part of the request processing component 320 or it can be stored elsewhere, such as in non-volatile storage 326. In one embodiment, the list 342 comprises a uniform resource locator (URL) for each of the alternative web services 310. The highest priority web service i=1 is identified by the first entry into the prioritized list 342, i.e., URL i=1. The second highest priority web service i=2 is identified by its URL i=2, etc.

Furthermore, the request processing component 320 may have a time-out component 344 for checking if a time-out condition has been met. The time-out component 344 reads the current time provided by the clock 330 when the web service request 334 is sent out via wireless interface 322 to one of the alternative web services 310. If no web service response is received from the one of the alternative web services, the time-out component 344 signals to the request processing component 320 that this alternative web service is currently unavailable. In response, the request processing component 320 can resend the web service request 334 to the next lowest alternative web service on the list 342.

In operation, the request processing component 320 may receive the service request 318 from the application program component 316. If the status information 324 indicates that the mobile terminal 314 is outside a network coverage area, the request processing component 320 transforms the service request 318 into an access request 340 for reading the offline version of the requested information 328 from the storage 326.

If the status information 324 indicates that the mobile terminal 314 is within the network coverage area of the wireless network 300, the request processing component 320 generates the web service request 334 for the highest priority alternative web service, i.e., web service i=1; the web service request 334 is in compliance with the WSDL description of the highest priority web service i=1. The WSDL description can be stored locally by the mobile terminal 314, such as in the request processing component 320 or the storage 326, or it can be obtained by accessing UDDI 346 via the wireless interface 322.

Sending of the web service request 334 starts the time-out component 344. If no web service response is received from the highest priority web service i=1 within the predefined time window given by the time-out component 344, the time-out component 344 signals unavailability of the highest priority web service i=1 to the request processing component 320. In response, the request processing component 320 reads the URL of the next alternative web service stored in the list 342 in the order given by the assigned priorities.

If required, the request processing component 320 reformats the web service request 334 in order to bring it into compliance with the WSDL description of the alternative web service i=2. Again, the WSDL description of the alternative web service i=2 can be stored locally on the mobile terminal 314 or it can be obtained from the UDDI 346.

If the time-out component 344 signals that the second highest priority web service i=2 is also unavailable, the request processing component 320 makes a consecutive attempt using the third highest priority web service i=3 until a web service response is received from one of the alternative web services.

In the event that none of the alternative web services 310 is available, the request processing component 320 converts the service request 318 into the access request 340 in order to obtain the offline version of the information 328 in order to provide the offline version of the information 328 to the requesting application program component 316.

Figure 4:
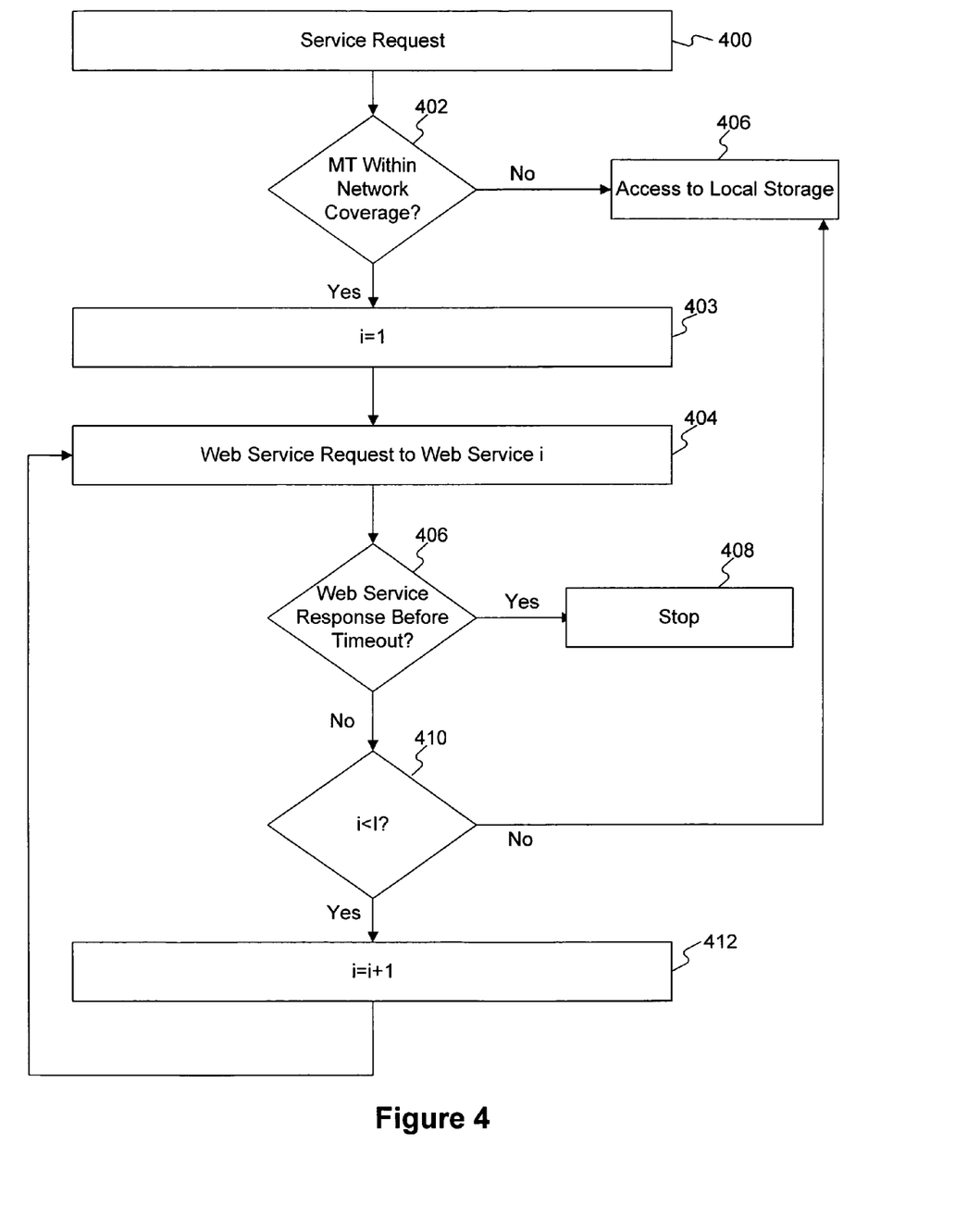
FIG. 4 is a flowchart of another exemplary method, consistent with an embodiment of the invention.

FIG. 4 shows a flowchart of an exemplary method related to the mobile terminal 314 of FIG. 3, consistent with an embodiment of the present invention. Steps in the embodiment of FIG. 4 that correspond to steps in the embodiment of FIG. 2 are designated by like reference numerals.

In step 400, the service request is received by the mobile terminal. If the mobile terminal (MT) is not within a network coverage area (step 402), a local storage component of the mobile terminal is accessed in order to read an offline version of the requested information (step 406).

If the the mobile terminal is within a network coverage area, the index i is initialized (step 403) and a web service request for the highest priority web service i=1 is generated in compliance with the WSDL description of this web service. The web service request is sent to the web service i=1 (step 404). If a web service response is received from the web service i before a time-out condition is met (step 406), the information contained in the web service response is returned to the service requester, e.g., the application program component, and the control stops in step 408.

If no such web service response is received before the time-out condition is met, it is determined whether there is still another alternative web service (step 410). This determination can be made by comparing the current value of the index i to the value I of the number of alternative web services on the list of alternative web services.

If another alternative web service is available, the control goes to step 412 where the index i is incremented. From there, the control goes back to step 404 where a new web service request is generated and sent to the alternative web service i. The new web service request in generated in compliance with the WSDL description of the alternative web service.

If a determination is made in step 410 that all alternative web services have already been tried out and hence all alternative web services are currently unavailable, the control goes from step 410 to step 406 in order to obtain an offline version of the requested information due to the fact that none of the web services is unavailable. Unavailability of a web service can be due to various reasons, such as a server outage.

Figure 5:
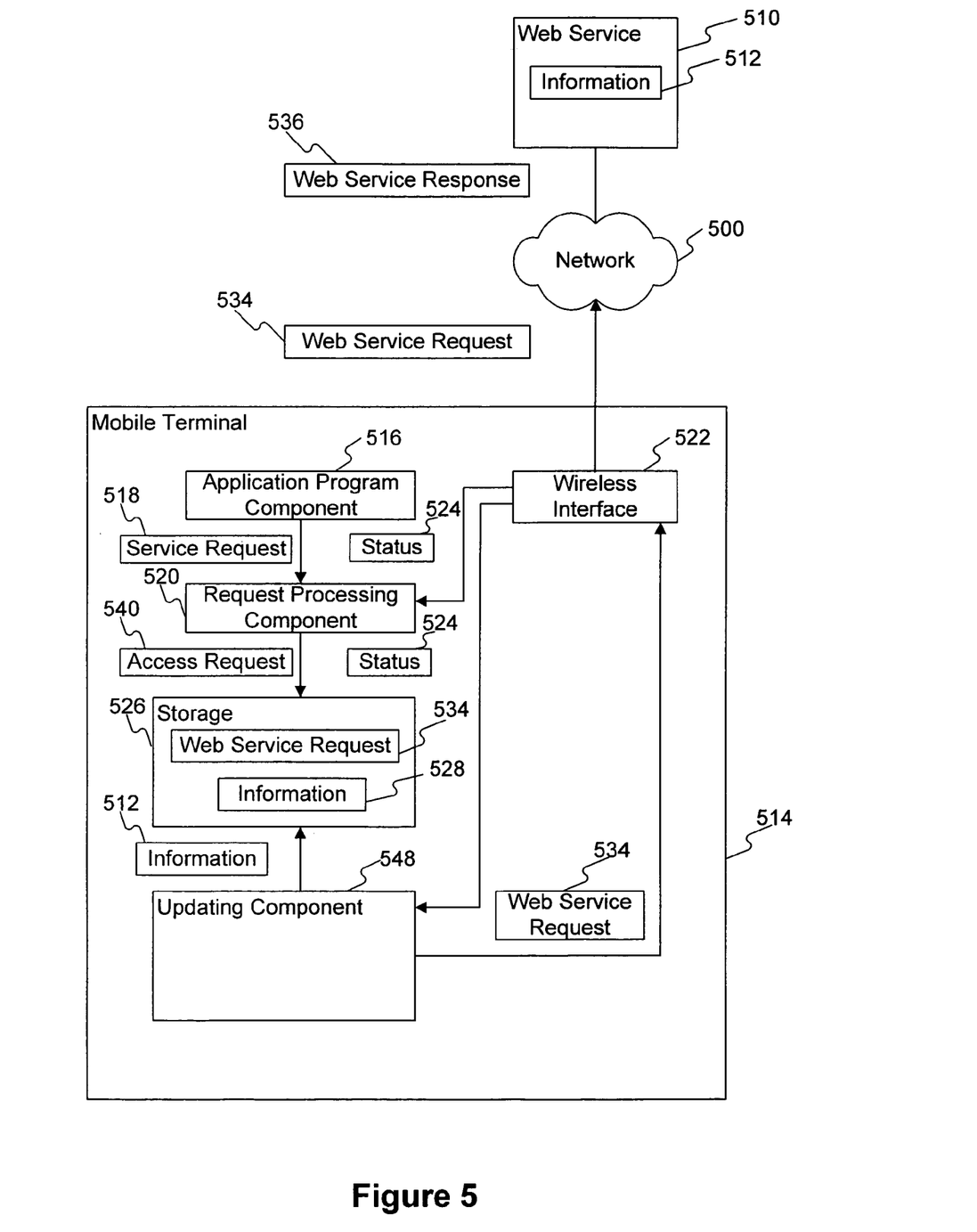
FIG. 5 is a block diagram of another exemplary mobile terminal of the invention comprising an updating functionality for the offline version of the information, consistent with an embodiment of the invention.

FIG. 5 shows an alternative mobile terminal, consistent with an embodiment of the present invention. Elements of the embodiment of FIG. 5 that correspond to elements in the embodiments of FIGS. 1 and 3 are designated by like reference numerals.

The mobile terminal 514 may have an updating component 548. The updating component 548 receives the status information 524 from the wireless interface 522. The status information 524 indicates when the mobile terminal 514 is within a network coverage area. In addition, the status information 524 can indicate the currently unused data transmission capacity of the communication channel provided by the wireless network 500 for the mobile terminal 514.

When the status information 524 received by the updating component 548 indicates that the mobile terminal 514 is within a network coverage area, the updating component 548 reads a predefined web service request 534 from the storage 526 and sends the web service request 534 to the web service 510 via the wireless interface 522 and wireless network 500. In response, the web service 510 returns its web service response 516 that is received by the updating component 548 by means of the wireless interface 522.

The web service response 536 contains the online version of the information 512. The updating component 548 reads the online version of the information 512 from the web service response 516 and overwrites the offline version of the information 528 by means of the most up to date online version of the information 512.

In one embodiment, the updating operation is performed when the status information 524 indicates not only network availability but also low usage of the available data transmission capacity. This avoids delaying the transmission of user data during the performance of the updating operation.

Figure 6:
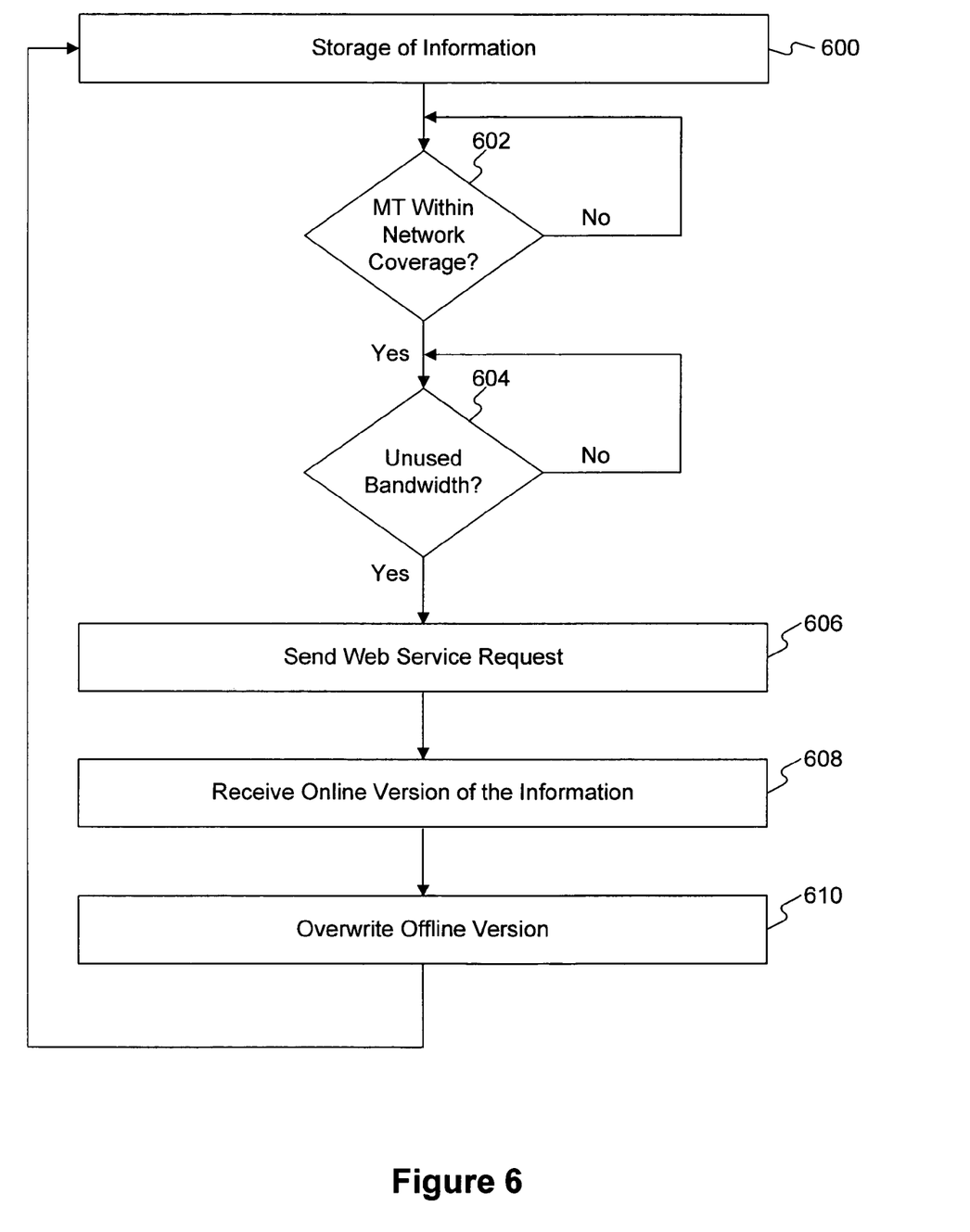
FIG. 6 is a flowchart of an exemplary updating operation, consistent with an embodiment of the invention.

FIG. 6 is a flowchart illustrating an exemplary updating operation, consistent with an embodiment of the present invention.

In step 600, an offline version of the information is stored in a local storage of the mobile terminal. The offline version of the information is used if an application program component requires the information and if there is no network coverage and/or no availability of a respective web service that can provide an online version of the information.

Frequent updating of the offline version of the information is useful as this enables to provide a relatively up to date version of the requested information to the requesting application program even if there is no network coverage and/or no web service availability.

A determination of whether the mobile terminal (MT) is within network coverage is made in step 602. the mobile terminal is not within network coverage, no updating operation is possible and step 602 is carried out repeatedly until the mobile terminal is within network coverage.

In step 604, it is checked whether there is unused data transmission capacity, i.e., unused bandwidth, on the communication channel established by the wireless network for the mobile terminal. If no unused bandwidth is available the control goes back to step 604 until unused bandwidth becomes available.

In step 606, a web service request is sent to the web service in order to obtain an up to date online version of the information. In step 608, the online version of the information is received as a web service response. The offline version of the information stored by the mobile terminal is overwritten by the online version received in step 608 (step 610). From step 610 the control returns to step 600.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A mobile electronic device, comprising:
   a request processing component for receiving an information request for information;
   a status information component for indicating whether the mobile electronic device is within a network coverage area;
   a wireless interface for coupling the mobile electronic device to a network in order to obtain an online version of the information from a web service;
   a storage component for storing the offline version of the information, wherein the request processing component is adapted to send a web service request to the web service in response to the information request when the status information component indicates the mobile electronic device is within the network coverage area and is further adapted to access the storage component when the status information component indicates network service is unavailable; and
   a time-out component, wherein the time-out component is adapted to signal unavailability of the web service or an alternative web service to the request processing component if no web service response is received within a predetermined time interval after the web service request has been sent.

2. The mobile electronic device of claim 1, further comprising:
   an application program component for generating the information request.

3. The mobile electronic device of claim 1, further comprising:
   a positioning component for providing geographical position information descriptive of a current geographical position of the mobile electronic device, wherein the information request comprises the geographical position information for specification of the requested information.

4. The mobile electronic device of claim 1, further comprising:
   a clock component for providing a time information, wherein the information request comprises the time information for specification of the requested information.

5. The mobile electronic device of claim 1, wherein the wireless interface is adapted to provide status information to the request processing component, the status information being descriptive of a current status of the wireless interface.

6. The mobile electronic device of claim 5, wherein the status information is descriptive of a network coverage status.

7. The mobile electronic device of claim 5, wherein the status information is descriptive of unused data transmission capacity of the wireless interface.

8. The mobile electronic device of claim 1, wherein the request processing component is adapted to access a number of alternative web services in order to resend the web service request to one of the alternative web services if the web service is unavailable.

9. The mobile electronic device of claim 1, further comprising:
   an updating component for obtaining the online version of the information from the web service while the mobile electronic device is within the network coverage area.

10. A method of providing information to a mobile electronic device, the method comprising:
    receiving an information request for information;
    determining whether the mobile electronic device is within a network coverage area;
    generating a web service request and sending the web service request to a web service via a wireless interface of the mobile electronic device in order to obtain an online version of the information when it is determined that the mobile electronic device is within the network coverage area;
    accessing a storage component of the mobile electronic device if the mobile electronic device is outside the network coverage area in order to obtain an offline version of the information when it is determined that the mobile electronic device is not within the network coverage area; and
    accessing a time-out component, wherein the time-out component is adapted to signal unavailability of the web service or an alternative web service to the request processing component if no web service response is received within a predetermined time interval after the web service request has been sent.

11. The method of claim 10, wherein the information request is received from an application program component of the mobile electronic device.

12. The method of claim 10, wherein the information request comprises at least one of geographic positioning information and time information for specification of the requested information.

13. The method of claim 12, wherein the requested information is at least one of traffic information, weather report information, event information and calendar information.

14. The method of claim 10, further comprising:
    resending the web service request to a number of alternative web services, if the web service is unavailable.

15. The method of claim 14, wherein the alternative web services are selected from a prioritized list of alternative web services.

16. The method of claim 14, wherein the web service request is resent after a time-out condition has been met.

17. The method of claim 10, further comprising:
    overwriting the offline version of the information with the online version of the information.

18. The method of claim 10, further comprising:
    sending an updating web service request to the web service for updating the offline version of the information stored in the storage component.

19. The method of claim 18, wherein the updating web service request is sent to the web service via the wireless interface if status information provided by the wireless interface indicates unused data transmission capacity.

20. A computer readable medium comprising instructions, the instructions causing a machine to:
    determine and indicate whether the mobile electronic device is within a network coverage area;
    generate a web service request and send the web service request to a web service via a wireless interface of the mobile electronic device in order to obtain an online version of requested information when the mobile electronic device is within the network coverage area;

access a storage component of the mobile electronic device if the mobile electronic device is outside the network coverage area in order to obtain an offline version of the requested information; and a time-out component, wherein the time-out component is adapted to signal unavailability of the web service or an alternative web service to the request processing component if no web service response is received within a predetermined time interval after the web service request has been sent.

21. The computer readable medium of claim 20, wherein an information request for the information is received from an application program component of the mobile electronic device.

22. The computer readable medium of claim 21, wherein the information request comprises at least one of geographic positioning information and time information for specification of the requested information.

23. The computer readable medium of claim 22, wherein the requested information is at least one of traffic information, weather report information, event information and calendar information.

24. The computer readable medium of claim 20, further causing the machine to:

resend the web service request to a number of alternative web services, if the web service is unavailable.

25. The computer readable medium of claim 24, wherein the alternative web services are selected from a prioritized list of alternative web services.

26. The computer readable medium of claim 24, wherein the web service request is resent after a time-out condition has been met.

27. The computer readable medium of claim 20, the readable medium further causing the machine to:

overwrite the offline version of the information with the online version of the information.

28. The computer readable medium of claim 20, the computer readable medium further causing the machine to:

send an updating web service request to the web service for updating the offline version of the information stored in the storage component.

29. The computer readable medium of claim 28, wherein the updating web service request is sent to the web service via the wireless interface if status information provided by the wireless interface indicates unused data transmission capacity.

* * * * *